(12) United States Patent
Cocks et al.

(10) Patent No.: US 11,379,629 B2
(45) Date of Patent: Jul. 5, 2022

(54) SYSTEM AND PROCESS FOR DESIGNING INTERNAL COMPONENTS FOR A GAS TURBINE ENGINE

(71) Applicant: United Technologies Corporation, Farmington, CT (US)

(72) Inventors: Peter Cocks, South Glastonbury, CT (US); Wookyung Kim, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 341 days.

(21) Appl. No.: 16/797,323

(22) Filed: Feb. 21, 2020

(65) Prior Publication Data

US 2021/0264072 A1 Aug. 26, 2021

(51) Int. Cl.
*G06F 30/00* (2020.01)
*G06F 30/17* (2020.01)
*G06N 3/08* (2006.01)
*G06F 30/20* (2020.01)
*G06F 111/20* (2020.01)

(52) U.S. Cl.
CPC .............. *G06F 30/17* (2020.01); *G06F 30/20* (2020.01); *G06N 3/08* (2013.01); *G06F 2111/20* (2020.01)

(58) Field of Classification Search
CPC ............ G06F 30/17; G06F 30/20; G06N 3/08
See application file for complete search history.

(56) References Cited

U.S. PATENT DOCUMENTS 8,409,691 B1 * 4/2013 Henry .................... B32B 5/028
428/174
8,915,329 B1 * 12/2014 Hermiller ............... F02K 1/827
181/293
9,541,106 B1 * 1/2017 Patel ..................... F15D 1/0065
2013/0302168 A1 * 11/2013 Kray ....................... F01D 5/141
416/131
2017/0183870 A1 * 6/2017 Cheung ................. E04C 5/0627
2019/0202543 A1 7/2019 Gatto

FOREIGN PATENT DOCUMENTS

| EP | 2177717 A1 | 4/2010 |
| EP | 3232008 A1 | 10/2017 |
| WO | 2019126507 | 6/2019 |

OTHER PUBLICATIONS

European Search report for Application No. 21157689.7 dated Jun. 18, 2021.

* cited by examiner

*Primary Examiner* — Jamel E Williams
(74) *Attorney, Agent, or Firm* — Carlson, Gaskey & Olds, P.C.

(57) ABSTRACT

A process for designing an internal turbine engine component including operating a test rig incorporating a physical morphing component having a first geometry and generating a data set of empirically determined component performance parameters corresponding to the first geometry. Providing the data set of empirically determined component performance parameters to a computational optimization system and automatically. Determining a geometry optimization of the morphing component. Altering the geometry of the morphing component to match the geometry optimization. Reiterating operating the test rig and providing the data set of empirically determined component performance parameters.

20 Claims, 3 Drawing Sheets

SYSTEM AND PROCESS FOR DESIGNING INTERNAL COMPONENTS FOR A GAS TURBINE ENGINE

TECHNICAL FIELD

The present disclosure relates generally to design processes for gas turbine engine components and more specifically to a process for iteratively designing internal engine component geometries.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Internal components of gas turbine engines, such as rotor blades, vanes, and the like, include complex aerodynamic shapes, with the geometries of the components having a large impact on the operation, efficiency, and life cycle the gas turbine engine including the components. Predictive physics based models for designing and simulating gas path component geometries aren't available for some gas turbine engine components, are prohibitively expensive for others, and can lack the required accuracy for a yet other engine components. Because of this, purely computer driven simulation design of components is not viable.

SUMMARY OF THE INVENTION

In one exemplary embodiment a process for designing an internal turbine engine component includes operating a test rig incorporating a physical morphing component having a first geometry and generating a data set of empirically determined component performance parameters corresponding to the first geometry, providing the data set of empirically determined component performance parameters to a computational optimization system and automatically determining an geometry optimization of the morphing component, altering the geometry of the morphing component to match the geometry optimization, and reiterating operating the test rig and providing the data set of empirically determined component performance parameters.

In another example of the above described process for designing an internal turbine engine component incorporating the morphing component includes incorporating a set of substantially identical morphing components.

In another example of any of the above described processes for designing an internal turbine engine component altering the geometry of the morphing component comprises applying the same optimization to each morphing component in the set of substantially identical morphing components.

In another example of any of the above described processes for designing an internal turbine engine component the morphing component is a component that is capable of altering one or more physical parameters, thereby changing a geometry of the component.

In another example of any of the above described processes for designing an internal turbine engine component altering the geometry of the morphing component comprises altering at least one parameter defined by at least one morphing structure within the component.

In another example of any of the above described processes for designing an internal turbine engine component altering the geometry of the morphing component comprises altering a plurality of parameters defined by the at least one morphing structure within the component.

In another example of any of the above described processes for designing an internal turbine engine component the test rig is a partial gas turbine engine.

In another example of any of the above described processes for designing an internal turbine engine component the computational optimization system includes a neural network based optimization and wherein automatically determining a geometry optimization of the morphing component includes analyzing the empirically determined engine parameters using the neural network based optimization.

In another example of any of the above described processes for designing an internal turbine engine component the neural network based optimization is trained using empirically determined, semi-real time data.

In another example of any of the above described processes for designing an internal turbine engine component the reiteration of operating the test rig and providing the data set of empirically determined component performance parameters is repeated until the computational optimization system determines that the geometry is optimized.

In another example of any of the above described processes for designing an internal turbine engine component the computational optimization system determines that the geometry is optimized in response to a presence of a stable loop of optimizations.

Another example of any of the above described processes for designing an internal turbine engine component further includes manufacturing a part using the optimized geometry.

In another example of any of the above described processes for designing an internal turbine engine component the computational optimization system determines that the geometry is optimized in response to all measured parameters in the data set of empirically determined component performance parameters being within an acceptable range.

Another example of any of the above described processes for designing an internal turbine engine component further includes exporting an optimized geometry to a part management system in response to determining that the geometry is optimized.

In another example of any of the above described processes for designing an internal turbine engine component altering the geometry of the morphing component to match the geometry optimization includes removing the morphing component from the test rig.

In another example of any of the above described processes for designing an internal turbine engine component altering the geometry of the morphing component is performed with the morphing component in the test rig.

In one exemplary embodiment a system for optimizing a geometry of a gas turbine engine component includes a test rig includes at least a portion of a gas turbine engine and a plurality of rig operation sensors, at least a portion of the gas turbine engine including at least one morphing component, and a computer system connected to the testing rig such that sensor outputs from the plurality of rig operation sensor are provided to the computer system, the computer system including a processor and a memory, wherein the memory incudes instructions configured to cause the processor to perform the steps of generating a data set of empirically determined component performance parameters corresponding to a first geometry of the morphing component, and providing the data set of empirically determined component performance parameters to a computational optimization system and automatically determining a geometry optimization of the morphing component.

In another example of the above described system for optimizing a geometry of a gas turbine engine component the computer system is further configured to output a set of control signals to the test rig in response to determining the geometry optimization of the morphing component, and wherein the test rig is configured to automatically morph at least one parameter of the at least one morphing component in response to receiving the control signals.

In another example of any of the above described systems for optimizing a geometry of a gas turbine engine component the at least one morphing component comprises a plurality of substantially identical morphing components.

In another example of any of the above described systems for optimizing a geometry of a gas turbine engine component the at least one morphing component is a gas path component within the test rig.

These and other features of the present invention can be best understood from the following specification and drawings, the following of which is a brief description.

DETAILED DESCRIPTION

Figure 1:
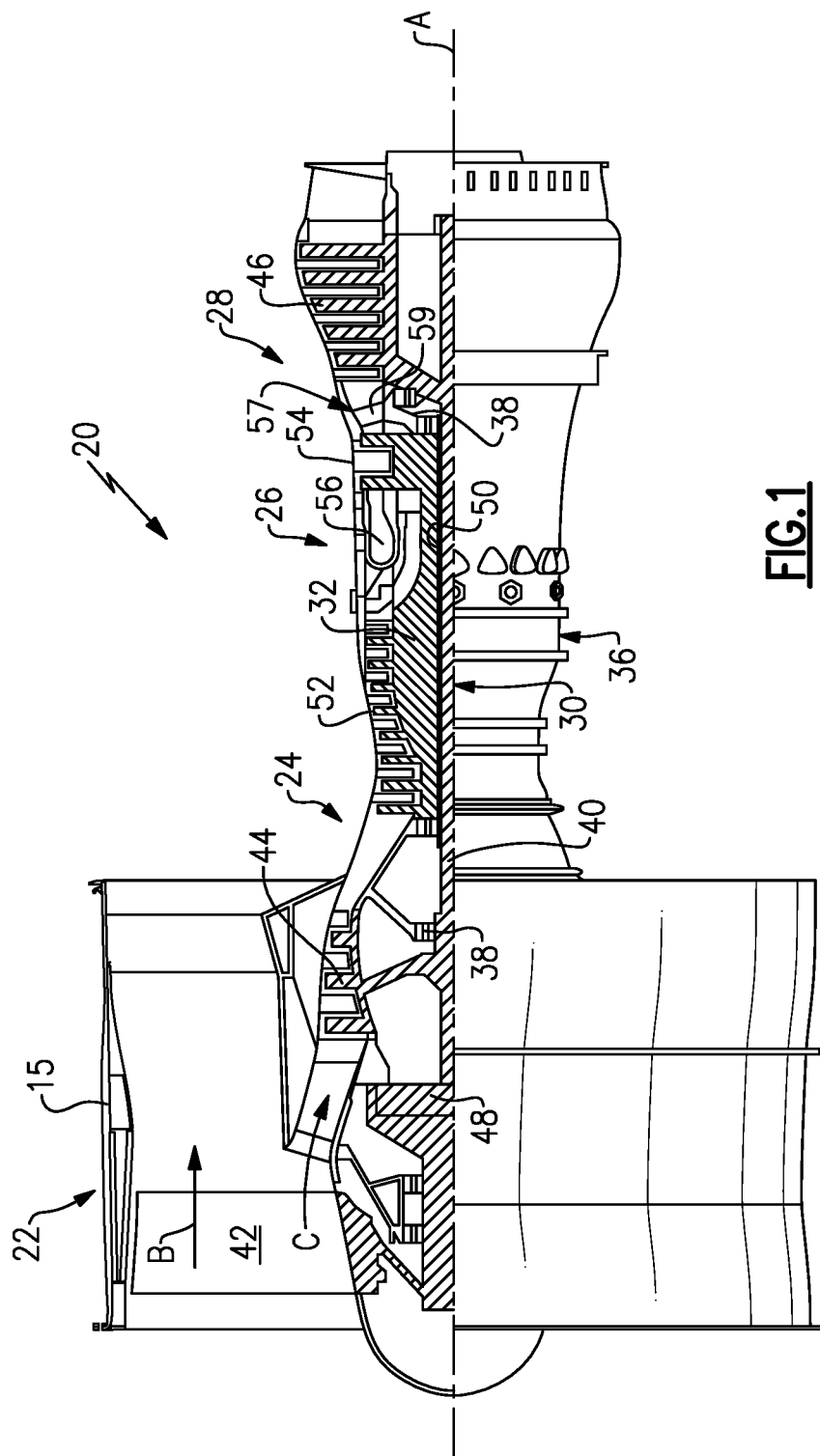
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system.

The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7 °R)]$^{0.5}$. The "Low corrected fan tip speed" as disclosed herein according to one non-limiting embodiment is less than about 1150 ft/second (350.5 meters/second).

The construction of the gas turbine engine 20 includes internal gas path components such as rotors, stators, blade outer air seals, as well as structural features that are intra-operatively combined to form the engine structure. A large number of these components are defined at least partially by complex exterior shapes (referred to as geometries) that allow for the component to properly and efficiently perform their designated function. By way of example, a rotor typically includes a blade extending from a radially inward platform and spanning a majority of the primary flow path. The platform is connected either directly or indirectly to the shaft via a bore that extends radially inward from the platform.

The operations, and efficiencies, of such a rotor are dependent on a large number of physical parameters defining the geometries including, but not limited to, the chord length of the blade, a curvature of the suction side of the blade, a curvature of the pressure side of the blade, an axial length of the blade, an angle of attack of the blade, etc.

Existing design processes determine design specifications for the geometric parameters of each engine component. Once the parameters are determined, prototype components are created, and a test engine is operated including the prototype components. Data from the test engine operations is analyzed by technicians who suggest modifications to the component parameters based on the test data and based on the technician's learned expertise. The suggested modifications are incorporated into a new parameter design, and an entire new prototype component, or set of prototype components, is created. The new prototype component(s) are is incorporated into the test engine, and the engine is again operated to determine the operational characteristics of the designed component.

This process of manually creating new prototypes and analyzing engine test results is time consuming and expensive due at least in part to the costs of creating new test components. In some cases a portion of the analysis of the results of any single test operation can be performed using computational models, such as machine learning systems or physics models. However, predictive physics based models (i.e. simulations) are not available for all gas turbine engine components. Further, in cases where such models are available, they can often lack the required accuracy or are too expensive. As such, full digital simulation of the operations is not feasible.

Because of these inadequacies, purely simulation based computational tools, such as machine learning systems or physical models, are not able to accurately simulate the operations of a gas turbine engine in a precise enough manner to generate a simulated test data set that can be used to optimize the engine components.

Figure 2:
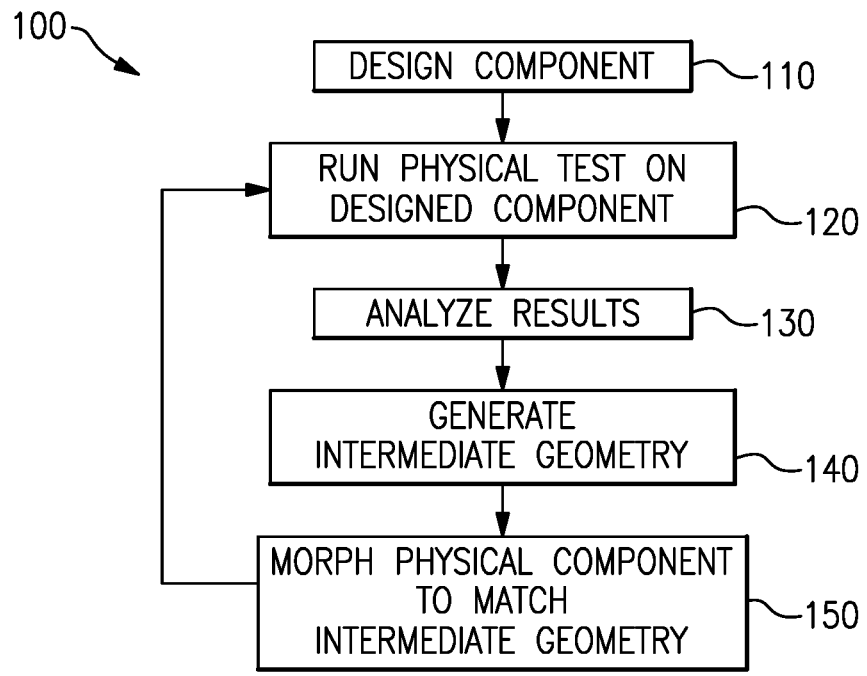
FIG. 2 illustrates a process for designing a geometry of an internal gas turbine engine component.

With continued reference to FIG. 1 above, FIG. 2 illustrates a method 100 for designing and optimizing a geometry of an internal gas path component for a gas turbine engine. The method 100 hybridizes a computational physics based optimization model with an efficient empirical test structure by using a morphing component. The hybridization allows for efficient, quick, and cheap iteration of component designs for internal gas turbine engine components by physically altering a geometry of a component (morphing the component) based on computationally determined optimizations.

Initially the physical parameters of an internal gas path component are designed according to any known design process in a "Design Component" step 110. The physical parameters define the external shape and characteristics of the engine component. By way of example, the internal engine components designed using this process 100 can include e.g., vanes, blades, diffusers, liners, cooling holes and swirlers.

Once the physical parameters of the component are designed, a morphing component having the same general construction is physically morphed to the designed shape and incorporated into a test engine or test rig. As used herein, a morphing component is a component that is capable of altering one or more physical parameters, thereby changing a geometry of the component and a same general construction is one that includes the underlying base components (e.g. a blade, a platform, and a root for a rotor). Once the morphing component is incorporated into the test engine or test rig, the test engine or test rig is operated and parameters of the engine operation are collected in an engine or rig operation data set using any known sensor configuration in a "Run Physical Test on Designed Component" step 120.

After completion of the engine test or rig test operations, the collected engine or rig operation data set is provided to a computational optimization system that mathematically analyzes the output data in an "Analyze Results" step 130. The computation optimization system is, in one example, a computerized neural network system that has been trained via data outputs from multiple empirical engine tests. The utilization of empirical engine data tests to train the neural network bypasses the computational difficulty associated computerized engine simulations by providing data sets from actual engine or rig tests.

The analyzation of the empirically determined data set is used by the computational optimization system to generate suggested physical changes to the component that may improve operations of the test engine or test rig in a "Generate Intermediate Geometry" step 140. In some examples the neural network can be configured to optimize for one specific factor, such as efficiency or thrust. In alternative examples, the neural network can be configured to optimize multiple factors simultaneously. The generated intermediate geometry is a modification to at least one external physical dimension of the previous geometry. By way of example, the optimization process can be a change in the chord length of the component, a curvature of sidewalls, or any other parameter defining a geometry of the component. In alternative examples, the generated intermediate geometry can be a modification to one or more interrelated parameters defining the exterior shape of the previous geometry.

Once the intermediate geometry has been generated, the suggested changes to the physical shape of the component are output to a technician. The physical component, or components are then morphed to match the suggested change in a "Morph Physical Component to Match Intermediate Geometry" step 150. The morphing can include altering a single physical parameter, such as chord length, or altering multiple parameters of the physical engine component. In some examples, morphing the physical engine component includes removing the component from the engine or rig and manually morphing the component resulting in a change to the geometry of the component. In alternative examples, some or all of the morphing can be automated. In the automated example, the intermediate geometry generated at step 140 can be output directly to the test engine and the component includes internal electronics or mechanical systems configured to convert the output optimizations to a physical morphing of the test component. In either example, the morphing includes altering the shape of the removed component and is not equivalent to replacing the original component with a different component.

Once the geometry of the component has been altered by the morphing, the process 100 returns to the Run Physical Test on Designed Component step 120, and the optimization process described above is reiterated. When the analysis indicates that the geometry design has been optimized, the process 100 stops iterating and a finalized geometry is provided to a design system. In some examples, the analysis can determine that the geometry is sufficiently optimized by ensuring that all measured parameters of the engine test are within an acceptable range. In other examples, the analysis can determine that suggested optimizations are below a threshold of modification and the part is then optimized. In yet other examples, the analysis can determine that a part is fully optimized by comparing the suggested optimizations against previous iterations and determining that a stable loop of optimizations has been entered (e.g. optimization 1 suggests +1 mm chord length, optimization 2 suggest −1 mm chord length, optimization 3 suggests +1 mm chord length, etc.). In other cases, optimization can be completed by finding the minimal gradient of objective geometry parameters as in (stochastic) gradient decent methods.

In another example, the optimization can include a check on the robustness of the optimization system. The robustness check determines how stable the optimal geometry determined in the optimization process is when considering variances such as manufacturing tolerances and thermal deformations. By way of example, if a typical manufacturing error is 2 mil, and a 2 mil variance changes the component performance in a significant manner, then a different optimization should be utilized because the determined optimal geometry is unstable. In contrast, if an optimized geometry is resilient to the variance changes the determined optimal geometry is stable. When the optimization is determined to be unstable, the iterative process to find a new optimal geometry is repeated.

Figure 3:
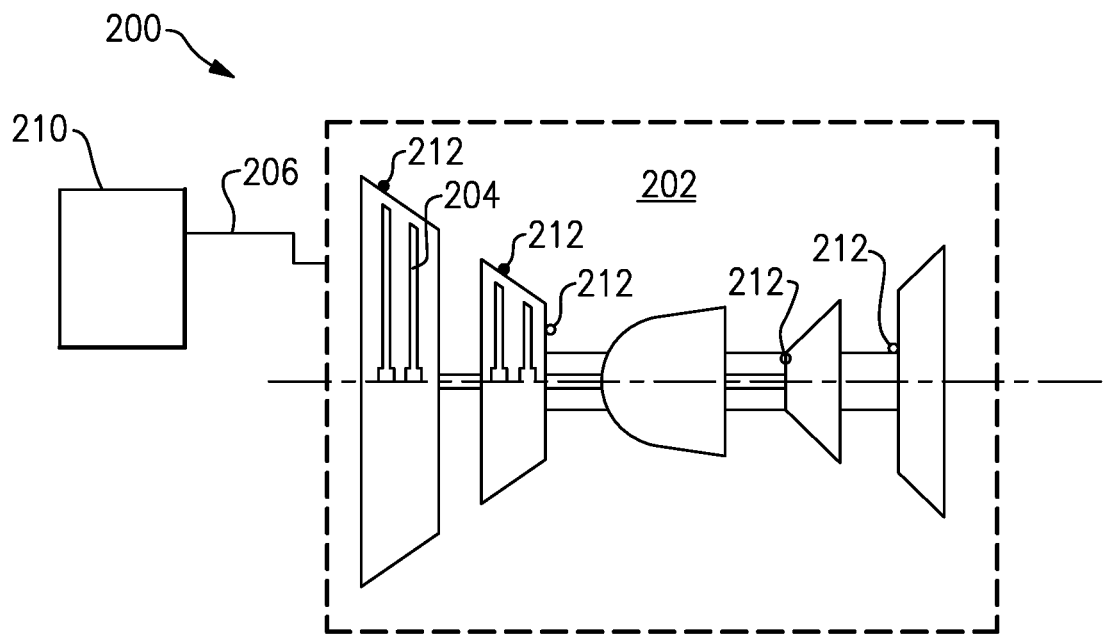
FIG. 3 schematically illustrates an exemplary testing configuration for implementing the process of FIG. 2.
Figure 4:
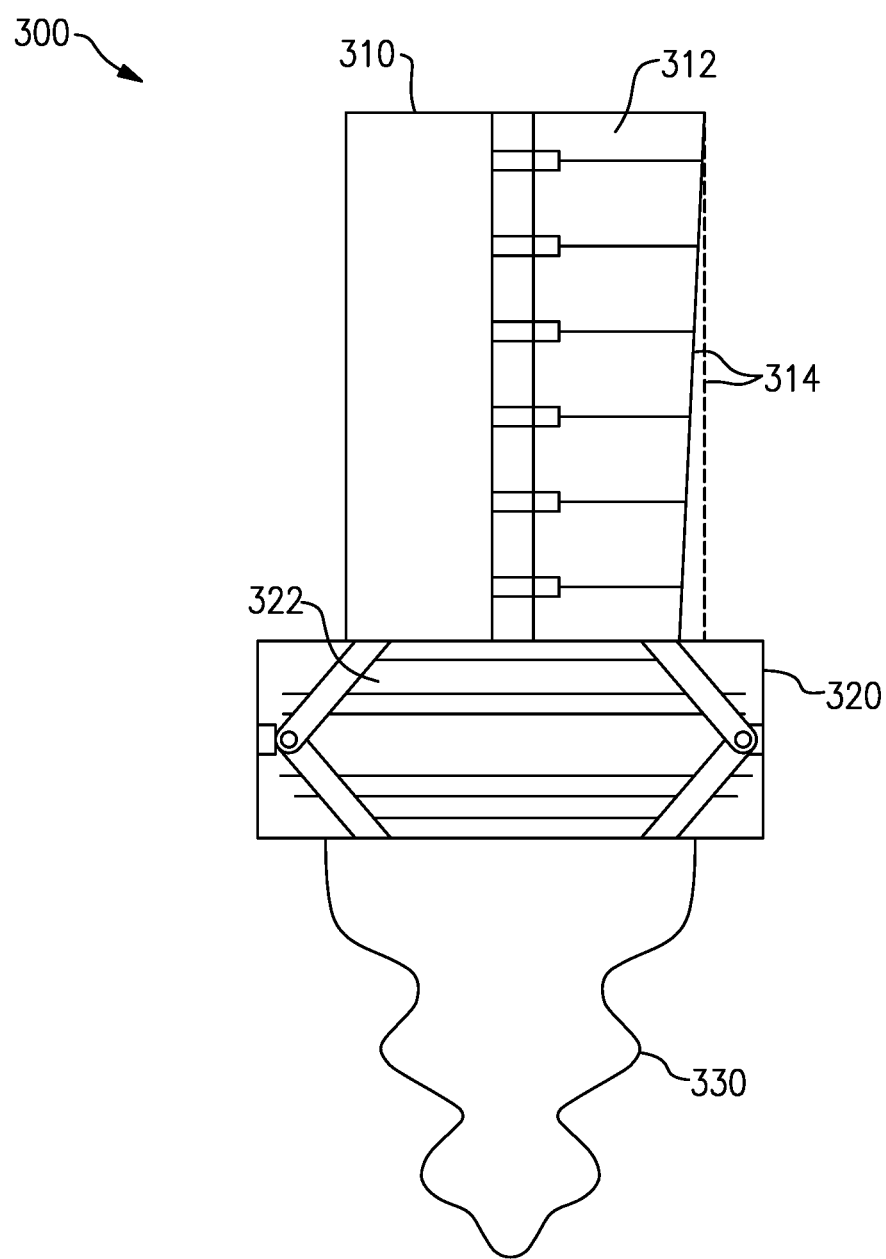
FIG. 4 schematically illustrates a morphing component according to one exemplary geometry.

With continued reference to FIGS. 1 and 2, FIG. 3 schematically illustrates an exemplary test rig 200 including a computer system 210 electronically connected to multiple sensors 212 disposed at various positions within the test rig 200. The sensors 212 can include temperature sensors, pressure sensors, flowspeed sensors, flow volume sensors, or any other sensor type configured to determine an operational parameter of the engine 202 within the test rig 200. Further, while illustrated as a complete engine 202 within the test rig, it is appreciated that the test rig can include only the parts of the engine 202 required to optimize the parameters of a given component.

Within the testing rig 200 are multiple distinct components. When performing the process described above, and illustrated in FIG. 2, one component 204, or a set of identical components, is a morphing component capable of having its geometry altered as previously described. The connected computer system 210 includes a processor and a memory with the memory storing instructions configured to cause the processor to perform the computational elements of the above described process. Sensor outputs from the sensor 212 are provided to the computer system 210 via a signal connection 206 according to any known configuration. In some examples, the computer system 210 can be further connected to a production system, and can output the determined specifications to the production system for manufacturing.

With continued reference to FIGS. 1-3, FIG. 4 schematically illustrates a morphing component 300 according to one example. The exemplary morphing component 300 has a general structure of a rotor including a blade 310, a platform 320, and a root 330. Within the general structure are mechanical features 312, 322 configured to alter at least one parameter of the component 300, and thereby morph corresponding aspects of the geometry of the component 300. By way of example, a blade morphing structure 312 is configured to alter an axial position (relative to an axis of the engine or test rig including the component 300) of the trailing edge 314 of the blade 310. Similarly, the platform 320 includes a morphing structure 322 configured to alter a radial height of the platform 320 and/or the blade 310.

Alternative morphing components can include additional and/or different morphing structures that can allow for different and more complicated morphing of the geometry to be performed. It is appreciated that the illustrated morphing component is purely exemplary in nature, and that any alternative morphing component or morphing configuration can be utilized within the above described design process.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A process for designing an internal turbine engine component comprising:
   operating a test rig incorporating a physical morphing component having a first geometry and generating a data set of empirically determined component performance parameters corresponding to the first geometry;
   providing the data set of empirically determined component performance parameters to a computational optimization system and automatically determining a geometry optimization of the morphing component;
   altering the geometry of the morphing component to match the geometry optimization; and
   reiterating operating the test rig and providing the data set of empirically determined component performance parameters.

2. The process of claim 1, wherein incorporating the morphing component includes incorporating a set of substantially identical morphing components.

3. The process of claim 2, wherein altering the geometry of the morphing component comprises applying the same optimization to each morphing component in the set of substantially identical morphing components.

4. The process of claim 1, wherein the morphing component is a component that is capable of altering one or more physical parameters, thereby changing a geometry of the component.

5. The process of claim 1, wherein altering the geometry of the morphing component comprises altering at least one parameter defined by at least one morphing structure within the component.

6. The process of claim 5, wherein altering the geometry of the morphing component comprises altering a plurality of parameters defined by the at least one morphing structure within the component.

7. The process of claim 1, wherein the test rig is a partial gas turbine engine.

8. The process of claim 1, wherein the computational optimization system includes a neural network based optimization and wherein automatically determining a geometry optimization of the morphing component includes analyzing the empirically determined component performance parameters using the neural network based optimization.

9. The process of claim 8, wherein the neural network based optimization is trained using empirically determined, semi-real-time data.

10. The process of claim 1, wherein the reiteration of operating the test rig and providing the data set of empirically determined component performance parameters is repeated until the computational optimization system determines that the geometry is optimized.

11. The process of claim 10, wherein the computational optimization system determines that the geometry is optimized in response to a presence of a stable loop of optimizations.

12. The process of claim 10, wherein the computational optimization system determines that the geometry is optimized in response to all measured parameters in the data set of empirically determined component performance parameters being within an acceptable range.

13. The process of claim 10, further comprising exporting an optimized geometry to a part management system in response to determining that the geometry is optimized.

14. The process of claim 10, further comprising manufacturing a part using the optimized geometry.

15. The process of claim 1, wherein altering the geometry of the morphing component to match the geometry optimization includes removing the morphing component from the test rig.

16. The process of claim 1, wherein altering the geometry of the morphing component is performed with the morphing component in the test rig.

17. A system for optimizing a geometry of a gas turbine engine component comprising:
 a test rig includes at least a portion of a gas turbine engine and a plurality of rig operation sensors, at least a portion of the gas turbine engine including at least one morphing component; and
 a computer system connected to the testing rig such that sensor outputs from the plurality of rig operation sensor are provided to the computer system, the computer system including a processor and a memory, wherein the memory incudes instructions configured to cause the processor to perform the steps of generating a data set of empirically determined component performance parameters corresponding to a first geometry of the morphing component, and providing the data set of empirically determined component performance parameters to a computational optimization system and automatically determining a geometry optimization of the morphing component.

18. The system of claim 17, wherein the computer system is further configured to output a set of control signals to the test rig in response to determining the geometry optimization of the morphing component, and wherein the test rig is configured to automatically morph at least one parameter of the at least one morphing component in response to receiving the control signals.

19. The system of claim 17, wherein the at least one morphing component comprises a plurality of substantially identical morphing components.

20. The system of claim 17, wherein the at least one morphing component is a gas path component within the test rig.

* * * * *